United States Patent
Lee et al.

(10) Patent No.: US 8,111,464 B2
(45) Date of Patent: Feb. 7, 2012

(54) OPTICAL LENS AND MANUFACTURING METHOD THEREOF

(75) Inventors: Jeong-yub Lee, Seoul (KR); Seung-wan Lee, Suwon-si (KR); Seung-tae Choi, Osan-si (KR); Woon-bae Kim, Suwon-si (KR); Jae-ho You, Hwaseong-si (KR); Che-heung Kim, Yongin-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 603 days.

(21) Appl. No.: 12/053,110

(22) Filed: Mar. 21, 2008

(65) Prior Publication Data

US 2009/0147371 A1    Jun. 11, 2009

(30) Foreign Application Priority Data

Dec. 6, 2007 (KR) .................. 10-2007-0126274

(51) Int. Cl.
*G02B 3/12* (2006.01)
*G02B 3/14* (2006.01)
(52) U.S. Cl. .................... 359/665; 359/666
(58) Field of Classification Search ........... 359/665–667
See application file for complete search history.

(56) References Cited

U.S. PATENT DOCUMENTS

| 5,726,782 A * | 3/1998 | Kato et al. ............ 359/3 |
| 2011/0017829 A1 * | 1/2011 | Wang et al. ........ 235/472.01 |

* cited by examiner

*Primary Examiner* — Scott J Sugarman
(74) *Attorney, Agent, or Firm* — Sughrue Mion, PLLC (57) ABSTRACT

A liquid optical lens which changes a focus due to a change in a shape of a translucent elastic membrane according to a change in a fluid pressure of a lens chamber and a manufacturing method thereof are provided. The liquid optical lens forms a dampproof coating membrane on the translucent elastic membrane to prevent a fluid from permeating through the translucent elastic membrane and a swelling phenomenon of the translucent elastic membrane.

35 Claims, 8 Drawing Sheets

OPTICAL LENS AND MANUFACTURING METHOD THEREOF

CROSS-REFERENCE TO RELATED APPLICATIONS

This application claims priority from Korean Patent Application No. 10-2007-0126274, filed Dec. 6, 2007, in the Korean Intellectual Property Office, the disclosure of which is incorporated herein by reference in its entirety.

BACKGROUND OF THE INVENTION

1. Field of the Invention

Methods and apparatuses consistent with the present invention relate to an optical lens and a manufacturing method thereof, and more particularly, to an optical lens which changes a focus due to a change in a shape of a translucent elastic membrane according to a change in a pressure in a lens chamber, and a manufacturing method thereof 2. Description of the Related Art In general, an optical lens is a transparent element or a lens that has at least two refraction curves. Such an optical lens has been widely used in various fields of the real life, for example, in various cameras, telescopes and microscopes.

For example, a camera module using the optical lens is applied to a personal mobile terminal such as a mobile phone or a PDA in addition to a camera set itself Recently, the personal mobile terminal has been developed to a multipurpose electronic device that has a variety of multimedia functions (e.g., camera, game, music, broadcast, and internet) in addition to a simple voice sending and receiving function, and, with this development, there has been an attempt to integrate more functions into a limited space.

Also, a recently developed camera module has advanced functions such as an auto focusing, an auto zooming, and an auto macro to be able to obtain a high quality of image, in addition to a basic function of a camera. However, if the camera module is to be mounted on a personal mobile terminal, there is a problem in reducing the size of the camera module because a size of a lens and a physical size of a mechanical lens driving device should be large sufficiently to have the advanced functions.

That is, in order to realize the advanced functions, various types of lenses such as a close-up lens, a normal lens, a telephoto lens, and a zoom lens should be provided and replaced according to a user's purpose. Also, in order to realize an auto focusing, an optical property (focal distance) of the lens should be variable, and an extra motor or driver is required to adjust this variation. Therefore, the whole size of the camera module inevitably increases.

To this end, a liquid lens or a fluid lens using an electrowetting phenomenon has been suggested.

The liquid lens performs an auto focusing and a zooming using a curvature variation of the lens. The liquid lens uses an electrowetting phenomenon to cause the curvature variation. The electrowetting is to control a surface tension of a conductive fluid by applying a voltage to an electrode coated with an insulating material and the conductive fluid when the conductive fluid and a non-conductive fluid come in contact with each other on the electrode and thus change a contact angle of the conductive fluid and an interfacial shape between the two fluids. This electrowetting has an advantage in reducing the size of the camera module because there is no mechanical lens movement.

Also, there has been an optical lens that is capable of auto focusing and zooming by changing a pressure exerted to an optical fluid contained in a lens chamber and thus changing a curvature of a translucent elastic membrane formed in the lens chamber. Such type of optical lens has a simplified structure and a simplified manufacturing process. Accordingly, the optical lens is easy to produce and also is of benefit to a mass production because it can be manufactured in a wafer level.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an optical lens which changes a focus by applying a pressure to a fluid and thus changing a curvature of a translucent elastic membrane and which also prevents the fluid from permeating through the translucent elastic membrane.

Also, the present invention provides an optical lens which changes a focus by applying a pressure to a fluid and thus changing a curvature of a translucent elastic membrane and which also improves a durability of the translucent elastic membrane.

Also, the present invention provides a manufacturing method of the optical lens described above.

According to an aspect of the present invention, there is provided an optical lens including a translucent substrate where a lens chamber is formed, a translucent elastic membrane which is formed to seal the lens chamber, a dampproof coating membrane which is formed on the translucent elastic membrane, and a fluid with which the lens chamber is filled.

According to another aspect of the present invention, there is provided an optical lens including a translucent substrate where a lens chamber and a fluidic chamber which fluidly communicate with each other are formed, a translucent elastic membrane which is formed to seal the lens chamber and the fluidic chamber, a dampproof coating membrane which is formed on the translucent elastic membrane, an actuator which is formed in contact with the fluidic chamber, and a fluid with which the lens chamber and the fluidic chamber are filled, and the optical lens changes a pressure exerted to the translucent elastic membrane by changing a volume of the fluidic chamber using the actuator.

The translucent elastic membrane may be made of polydimethylsiloxane.

The dampproof coating membrane may be formed on either an outer surface or an inner surface of the translucent elastic membrane, or may be formed on both an inner surface and an outer surface of the translucent elastic membrane. The dampproof coating membrane may be inserted into a middle of the translucent elastic membrane.

The dampproof coating membrane may include a translucent oxide layer of at least one layer, or may include a translucent oxide layer of at least one layer and a soft buffer layer of at least one layer. The translucent oxide layer may be made of any one selected from the group consisting of $Al_2O_3$, $TiO_2$ and $SiO_2$, and the soft buffer layer may be made of polyurea or polydimethylsiloxane which is same as that of the translucent elastic membrane. The soft buffer layer may be made of elastomer or transparent polymer. Also, for the translucent oxide layer, parylene, polyurethane, Teflon, or fluoride coating polymer may be used. The translucent elastic membrane may have a thickness of 10-500 um, and the dampproof coating membrane may have a thickness of 1-50 um.

The dampproof coating membrane may include a dampproof layer of at least one layer which is made of any one selected from the group consisting of parlene, polyurethane, Teflon, and fluoride coating polymer, and a soft buffer layer of at least one layer which is made of any one selected from the group consisting of polydimethylsiloxane, polyurea, transparent elastomer and transparent soft polymer.

According to still another aspect of the present invention, there is provided an optical lens including a lens frame which has a lens chamber filled with an optical fluid, a translucent elastic membrane which is connected to an upper surface of the lens frame, and a dampproof coating membrane which is formed on the translucent elastic membrane.

The dampproof coating membrane may be formed on at least one or both of a surface of the translucent elastic membrane contacting the optical fluid and a surface of the translucent elastic membrane contacting air.

The translucent elastic membrane may include a first translucent elastic membrane and a second translucent elastic membrane which are layered one on the other, and the dampproof coating membrane may be formed between the first and the second translucent elastic membranes.

According to still another aspect of the present invention, there is provided a method for manufacturing an optical lens, the method including forming a lens chamber on a translucent substrate, forming a translucent elastic membrane to seal an opening of the lens chamber, and forming a dampproof coating membrane on the translucent elastic membrane.

The method may further include $O_2$ plasma ashing prior to sealing the opening of the lens chamber with the translucent elastic membrane.

According to still another aspect of the present invention, there is provided a method for manufacturing an optical lens, the method including forming a lens frame which has a lens chamber filled with an optical fluid, forming a dampproof coating membrane on one side surface or opposite side surfaces of the translucent elastic membrane, and connecting the translucent elastic membrane where the dampproof coating membrane is formed to the lens frame.

The method may further include forming an additional dampproof coating membrane on an inner surface of the lens chamber of the lens frame after connecting the translucent elastic membrane to the lens frame.

BRIEF DESCRIPTION OF THE DRAWINGS

Above and other aspects of the present invention will become apparent and more readily appreciated from the following description of the exemplary embodiments, taken in conjunction with the accompany drawings of which.

DETAILED DESCRIPTION OF EXEMPLARY EMBODIMENTS

Certain exemplary embodiments of the present invention will be described in greater detail with reference to the accompanying drawings.

In the following description, the same drawing reference numerals are used for the same elements even in different drawings. The matter defined in the description, such as detailed construction and elements, are provided to assist in a comprehensive understanding of the invention. Thus, it is apparent that the exemplary embodiments of the present invention can be carried out without this specifically defined matter. Also, well-known functions or constructions are not described in detail since they would obscure the invention with unnecessary detail.

Figure 1:
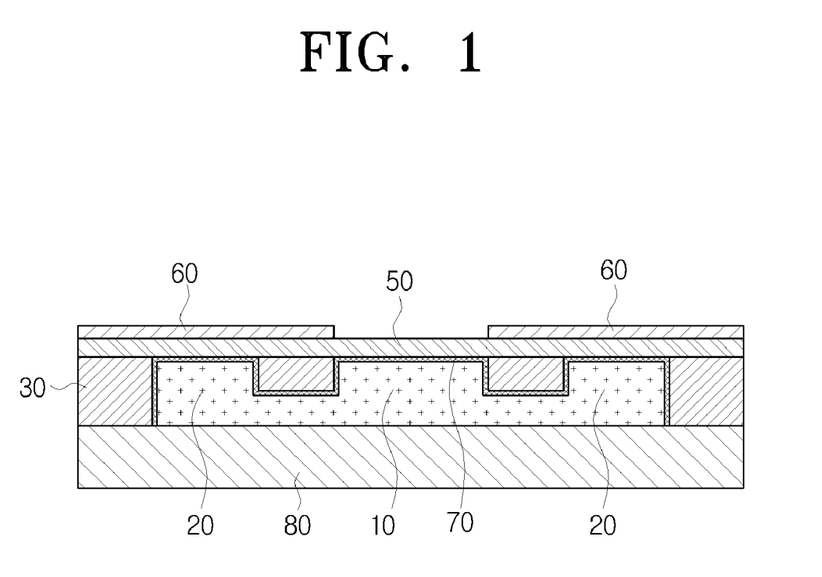
FIG. 1 is a cross-section view illustrating an optical lens according to an exemplary embodiment of the present invention.
Figure 2:
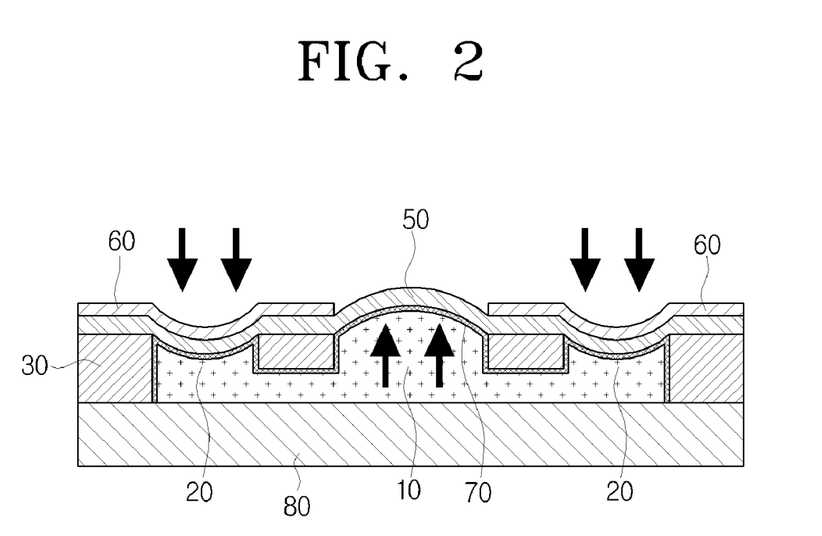
FIG. 2 is a cross-section view illustrating an operation of the optical lens of FIG. 1.

FIG. 1 is a cross-section view illustrating an optical lens according to an exemplary embodiment of the present invention, and FIG. 2 is a cross-section view illustrating an operation of the optical lens of FIG. 1.

Referring to FIG. 1, an optical lens according to an exemplary embodiment of the present invention comprises a lens frame 30 which has a lens chamber 10 and a fluidic chamber 20 fluidly communicating with the lens chamber 10, a translucent substrate 80, a translucent elastic membrane 50 sealing openings of the lens chamber 10 and the fluidic chamber 20, and an actuator 60 attached to the translucent elastic membrane 50. Although the translucent elastic membrane 50 extends up to the opening of the fluidic chamber 20 in the drawings, the actuator 60 may directly cover the opening of the fluidic chamber 20 or a buffer layer made of a different material from that of the translucent elastic membrane 50 may cover the opening of the fluidic chamber 20.

As shown in FIG. 2, if a pressure is applied to a fluid in the lens chamber 10, the translucent elastic membrane 50 swells and thus serves to change a curvature of a variable focus lens. The translucent elastic membrane 50 is transparent and has a good elastic property. For the translucent elastic membrane 50, a polymer having a good light permeability and a high elastic force may be used. For example, a polydimethylsiloxane (PDMS) may be used. The translucent elastic membrane 50 may have a thickness of 10-500 um.

The optical lens further comprises a dampproof coating membrane 70 formed on a surface of the translucent elastic membrane 50 to prevent the fluid from permeating through and being absorbed into the translucent elastic membrane 50. The dampproof coating membrane 70 may have a thin thickness within 10% of the thickness of the translucent elastic membrane 50, and more specifically, may have a thickness of 1-50 um.

FIGS. 3A to 3E are views illustrating various examples of the dampproof coating membrane 70 formed on the translucent elastic membrane 50.

Figure 3A:
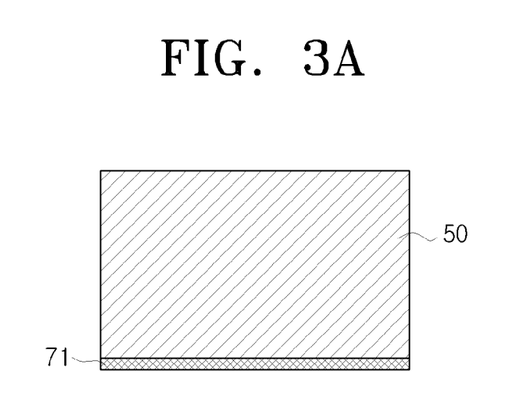
FIGS. 3A to 3E are cross-section views illustrating various examples of a dampproof coating membrane according to the exemplary embodiment of the present invention.

FIG. 3A illustrates a single oxide layer coated over the surface of the translucent elastic membrane 50 as the dampproof coating membrane 70. This oxide layer may have a thin thickness of submicron since it has a hard physical property. For the oxide layer, $Al_2O_3$, $TiO_2$, $SiO_2$ having a good light permeability may be used. Alternatively, parylene, polyurethane, Teflon, or fluoride coating polymer, which have a good light permeability, have no reactivity to the translucent elastic membrane 50, and have a moisture-proof property, may be used instead of the oxide layer for the dampproof coating membrane 70.

Figure 3B:
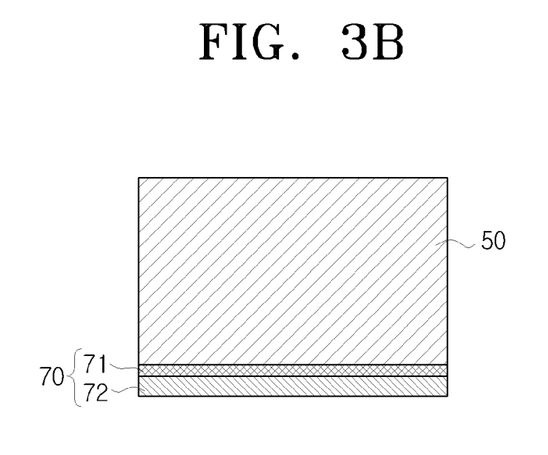

Also, as shown in FIG. 3B, the dampproof coating membrane 70 formed on the surface of the translucent elastic membrane 50 may be of a 2-layer structure comprising a translucent oxide layer 71 and a buffer layer 72. The translucent oxide layer 71 may be made of $Al_2O_3$, $TiO_2$, and $SiO_2$. The buffer layer 72 is soft and flexible and may be made of a polymer having a good light permeability in order to complement a hardness of the translucent oxide layer 71 formed on the translucent elastic membrane 50. For example, polyurea or polydimethylsiloxane which is same as that of the translucent elastic membrane 50 may be used for the buffer layer 72. The translucent oxide layer 71 and the buffer layer 72 may be fabricated using materials having similar refractive indexes to prevent the light permeability from being reduced. For example, $Al_2O_3$ and polyurea have a refractive index of about 1.6. The soft buffer layer 72 may be made of elastomer or transparent polymer.

Figure 3C:
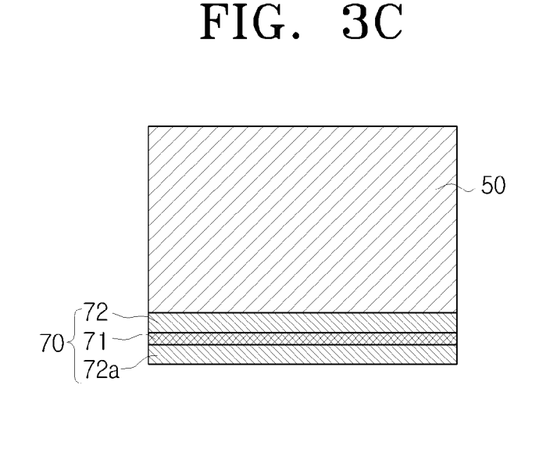
Figure 3D:
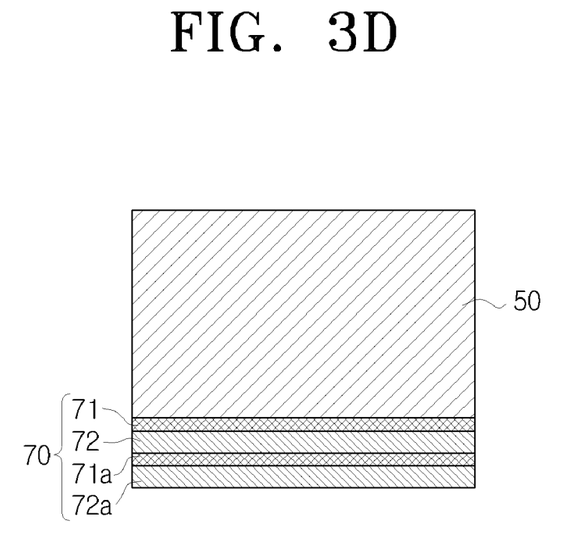
Figure 3E:
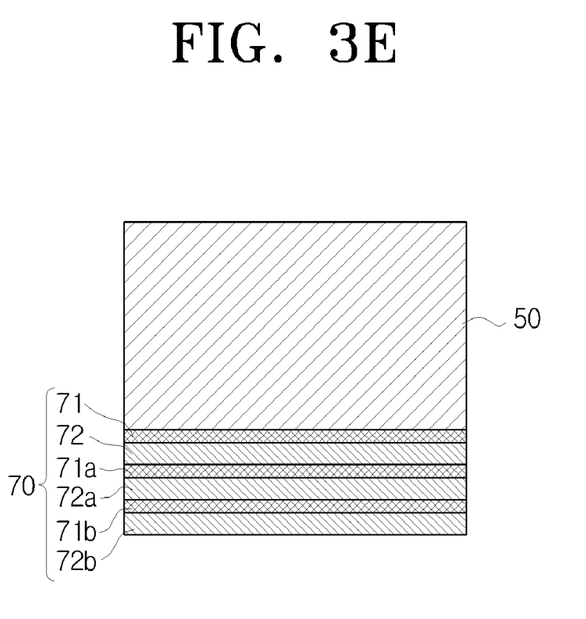

Also, referring to FIGS. 3C to 3E, the dampproof coating membrane 70 may comprise a plurality of translucent oxide layers 71, 71a, 71b and a plurality of buffer layers 72, 72a, 72b.

Figure 4A:
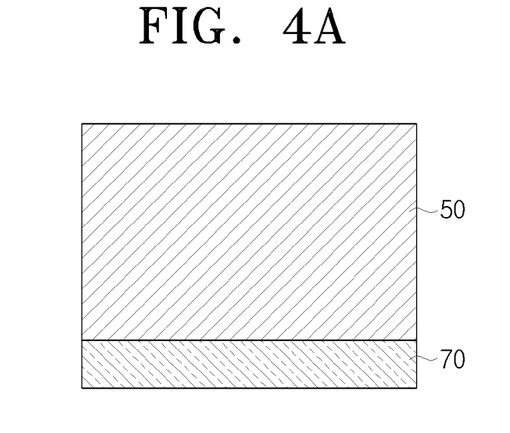
FIGS. 4A to 4C are cross-section views illustrating various examples of a translucent elastic membrane where a dampproof coating membrane is formed according to an exemplary embodiment of the present invention.
Figure 4B:
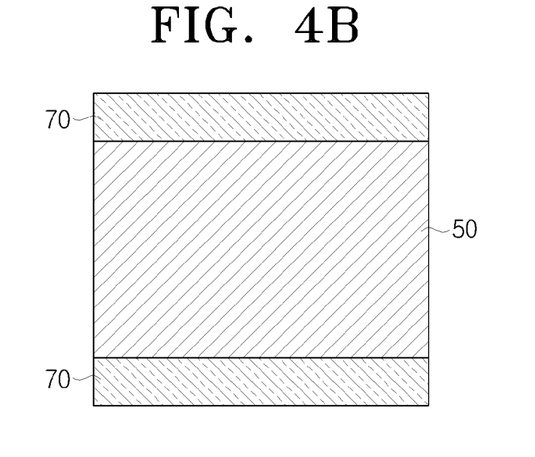
Figure 4C:
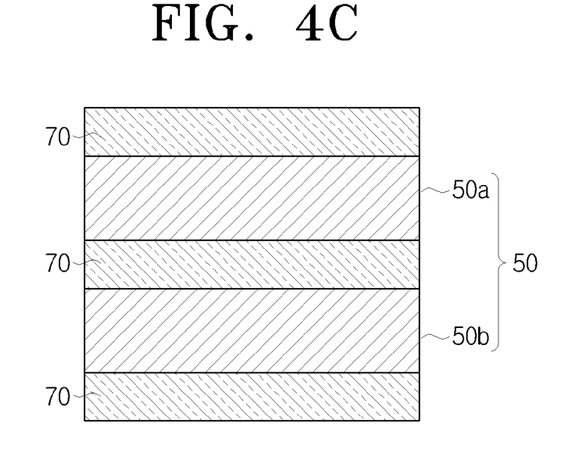

FIGS. 4A to 4C are views illustrating various examples of a translucent oxide layer of an optical lens according to another exemplary embodiment of the present invention.

The dampproof coating membrane 70 may be formed on only a lens chamber-sided surface as shown in FIG. 4A, and also, the dampproof coating membrane 70 may be formed on both an inner surface and an outer surface of the lens chamber simultaneously, as shown in FIG. 4B. Also, as shown in FIG. 4C, the translucent elastic membrane 50 may be divided into a first translucent elastic membrane 50a and a second translucent elastic membrane 50b and the dampproof coating membrane 70 may be interposed therebetween.

Figure 5A:
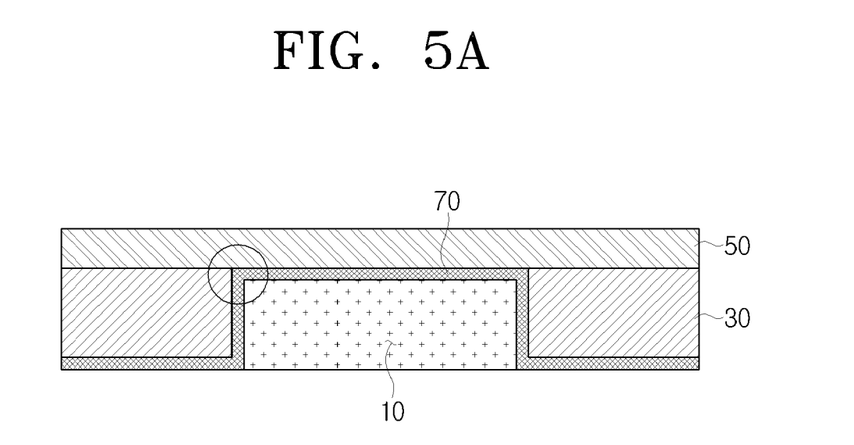
FIGS. 5A and 5B are cross-section views illustrating a main part of the optical lens to which the dampproof coating membrane is applied according to the exemplary embodiment of the present invention.
Figure 5B:
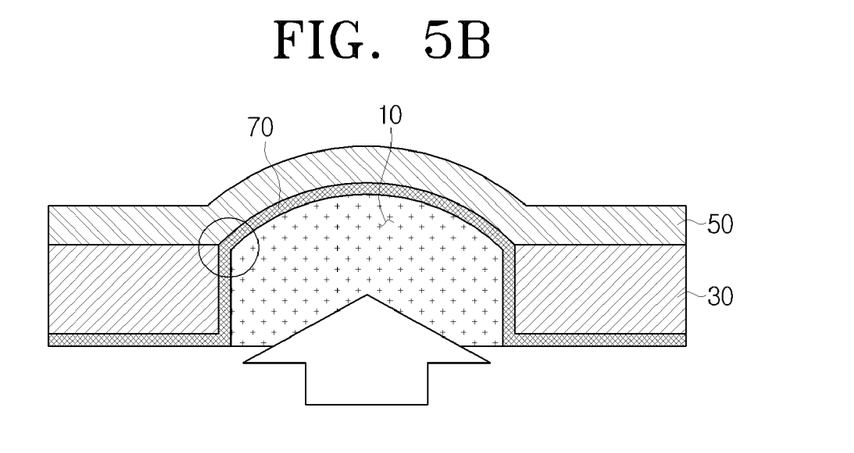

FIGS. 5A and 5B are cross-section views illustrating the optical lens to which the dampproof coating membrane 70 is applied according to the exemplary embodiment of the present invention. The lens frame 30 of the optical lens is made of a rigid material such as silicone, silicone coated with $SiO_2$ or glass. The translucent elastic membrane 50 is securely connected to an upper portion of the lens frame 30. A certain portion of the translucent elastic membrane 50 which is connected to the upper portion of the lens frame 30 is in contact with an optical fluid and is able to change its shape easily according to a flow of the optical fluid. An area where the lens frame 30, the translucent elastic membrane 50, and the optical fluid meet (marked by a circle) is susceptible to an exterior force, which may cause a break and a fatigue failure.

As shown in FIGS. 5A and 5B, the dampproof coating membrane 70 is coated over a surface of the translucent elastic membrane 50 which is filled with the optical fluid so that the dampproof coating membrane 70 can bring the optical fluid into contact with a cavity (lens chamber) satisfactorily and prevent the optical fluid from permeating through and being absorbed into the translucent elastic membrane 50. Also, the dampproof coating membrane 70 protects the area where the lens frame 30, the translucent elastic membrane 50, and the optical fluid meet from a stress concentration and thus guarantees the reliability of repeated operations of the translucent elastic membrane 50.

FIGS. 6A to 6D are cross-section views illustrating an optical lens according to another exemplary embodiment of the present invention.

Figure 6A:
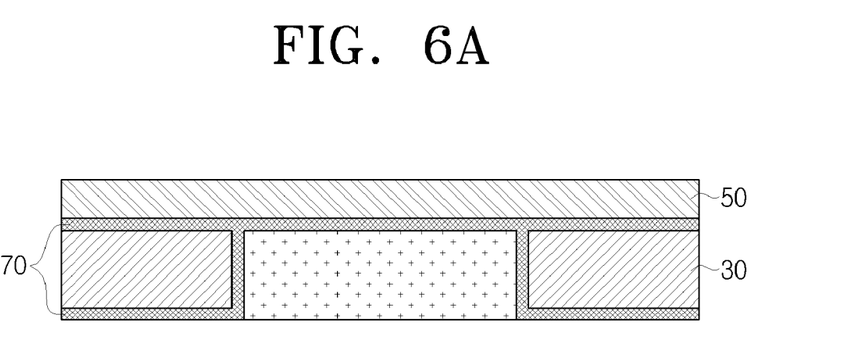
FIGS. 6A to 6D are cross-section views illustrating a main part of an optical lens to which a dampproof coating membrane is applied according to another exemplary embodiment of the present invention.

FIG. 6A illustrates an optical lens which is fabricated by coating a dampproof coating membrane 70 on a translucent elastic membrane 50 in advance and then attaching a coating surface of the dampproof coating membrane 70 to the lens frame 30. This process is performed if the dampproof coating membrane 70 and the lens frame 30 have a good adherence therebetween, FIG. 6B illustrates an optical lens which further comprises a second dampproof coating membrane 70' formed on an outer surface of the translucent elastic membrane 50 which is in contact with air, as a supplementary element for FIG. 5A or 6A.

Figure 6B:
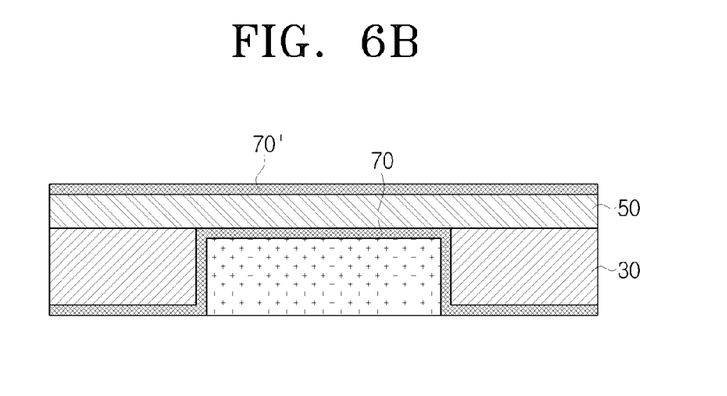
Figure 6C:
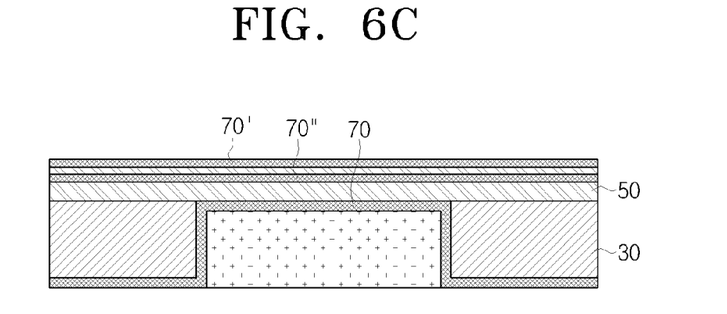

FIG. 6C illustrates an optical lens which further comprises another dampproof coating membrane 70'' formed in the middle of the translucent elastic membrane 50, as a supplementary element for FIG. 5A or FIGS. 6A and 6B.

Figure 6D:
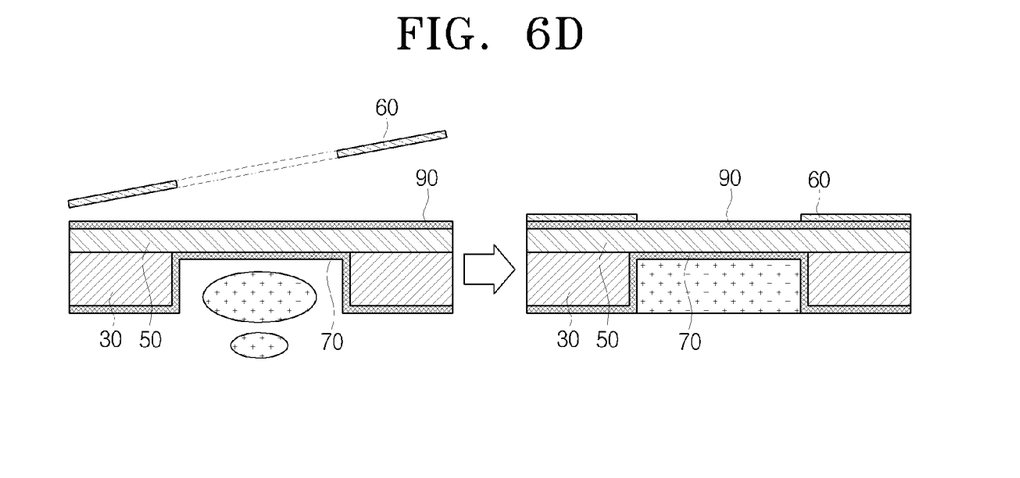

FIG. 6D illustrates another example of the optical lens of FIG. 6B. If a process of adhering other structure such as an actuator 60 to the translucent elastic membrane 50 is required, a layer coating 90 is provided on a surface of the translucent elastic membrane 50 to compensate for the poor surface adherence of the translucent elastic membrane 50 and thus increase an adhesive force and make it easy to adhere the actuator 60 to the translucent elastic membrane 50.

FIGS. 7A to 7H are views illustrating a method for manufacturing an optical lens having a dampproof coating membrane according to an exemplary embodiment of the present invention.

Figure 7A:
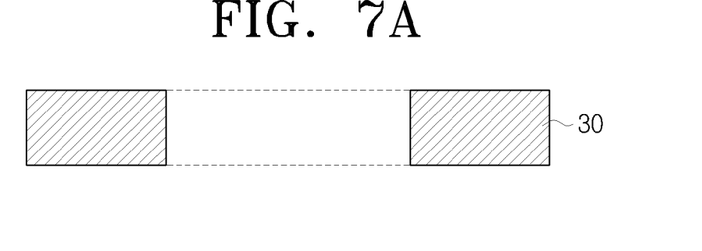
FIGS. 7A to 7H are views illustrating a method for manufacturing an optical lens having a dampproof coating membrane according to an exemplary embodiment of the present invention.

Referring to FIG. 7A, a lens frame 30 is fabricated by forming a penetrating hole on a substrate to form a lens chamber. If a silicone substrate is used, the penetrating hole is formed by a wet etching using TMAH or a deep RIE etching using $SF_6/C_4H_8$. Alternatively, a glass substrate may be used.

Figure 7B:
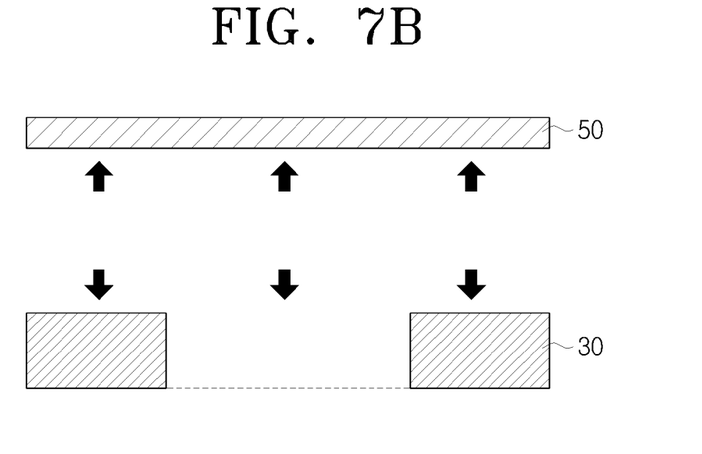

Next, as shown in FIG. 7B, a surface modification may be performed with respect to a surface of a translucent elastic membrane 50 to be attached to the lens frame 30 and an attaching surface of the lens frame 30 through a $O_2$ plasma ashing. This surface modification results in a securer connection between the translucent elastic membrane 50 and the lens frame 30.

Figure 7C:
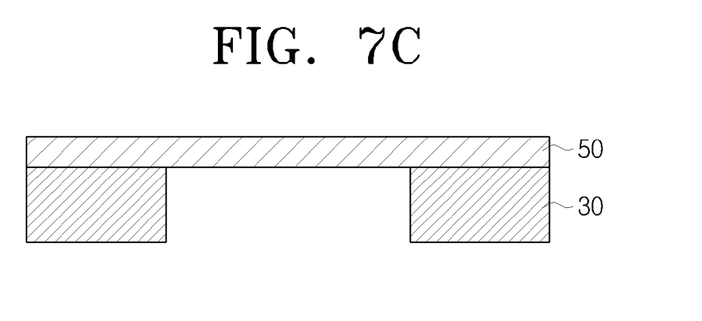

Next, as shown in FIG. 7C, the translucent elastic membrane 50 and the lens frame 30 are attached to each other using an electrostatic force obtained through a plasma process.

Figure 7D:
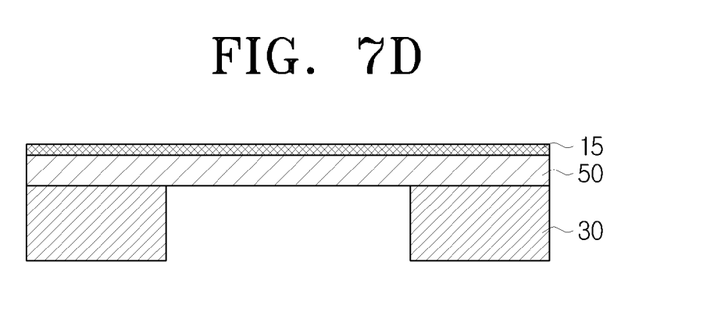

Next, as shown in FIG. 7D, a protection layer 15 may be formed on an upper surface of the translucent elastic membrane 50 to protect contamination, but this process is optional.

Figure 7E:
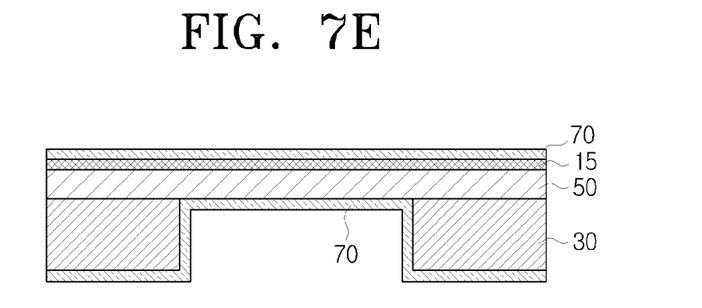

Next, as shown in FIG. 7E, a dampproof coating membrane 70 is formed along a lens chamber-sided surface of the lens frame 30. The dampproof coating membrane 70 is formed with enhanced step coverage in order to protect a susceptible edge where the lens frame 30 and the translucent elastic membrane 50 join together. The edge is easy to deform because a stress concentrates on that edge as the translucent elastic membrane 50 is deformed. For example, a sputtering or a CVD has enhanced step coverage. The dampproof coating layer 70 is a single-layered structure or a multi-layered structure having a translucent oxide layer 71 (see FIG. 3) and a polymer buffer layer 72 (see FIG. 3) coated in sequence.

Figure 7F:
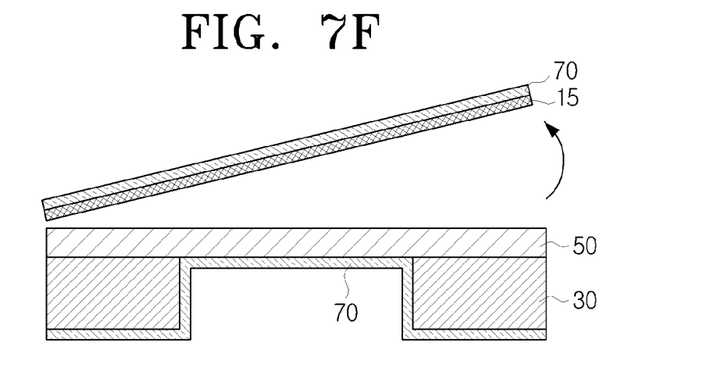

Next, as shown in FIG. 7F, the protection layer 15 is removed from the upper surface of the translucent elastic membrane 50.

Figure 7G:
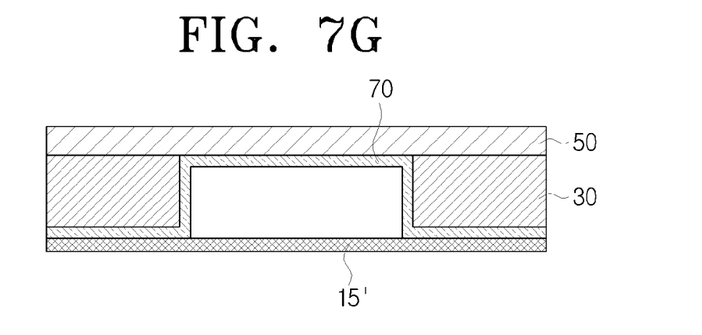
Figure 7H:
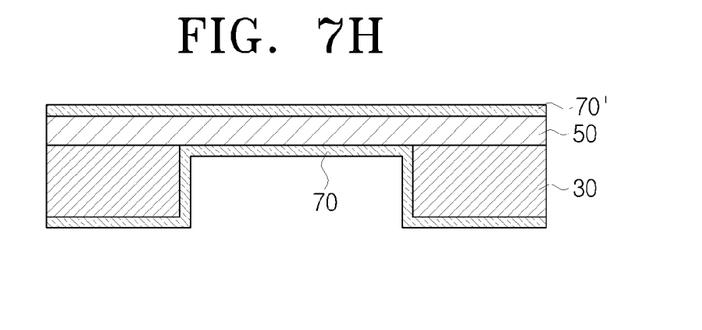

Next, as shown in FIGS. 7G and 7H, another dampproof coating membrane 70' may be additionally formed on the upper portion of the translucent elastic membrane 50, but this process is not essential. In order to form another dampproof coating membrane 70', another protection layer 15' is formed on the lens frame 30 opposite the translucent elastic membrane 50 as shown in FIG. 7G.

Next, as shown in FIG. 7H, the protection layer 15' is removed after the dampproof coating membrane 70' is formed on the outer surface of the translucent elastic membrane 50 such that an optical lens having the dampproof coating membranes 70 and 70' formed on opposite side surfaces of the translucent elastic membrane 50 is completed.

According to another exemplary embodiment of the present invention, prior to attaching the translucent elastic membrane 50 to the lens frame 30, the dampproof coating membrane 70 is formed on one side surface or opposite side surface of the translucent elastic membrane 50, and then, the translucent elastic membrane 50 where the dampproof coating membrane 70 is formed is attached to the lens frame 30. After that, if necessary, another dampproof coating membrane 70 of a single layer or a multilayer structure is additionally formed on an inner surface of the lens chamber of the lens frame 30.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical lens comprising:
a translucent substrate where a lens chamber is formed;
a translucent elastic membrane which is formed to seal the lens chamber;
a dampproof coating membrane which is formed on the translucent elastic membrane to prevent a fluid from permeating through and being absorbed into the translucent elastic membrane; and
the fluid with which the lens chamber is filled,
wherein the dampproof coating membrane is disposed between the translucent elastic membrane and the fluid, and a light passes through both the dampproof coating membrane and the translucent elastic membrane.

2. The optical lens as claimed in claim 1, wherein the translucent elastic membrane is made of polydimethylsiloxane.

3. The optical lens as claimed in claim 1, wherein the dampproof coating membrane is formed on an inner surface of the translucent elastic membrane.

4. The optical lens as claimed in claim 3, wherein a second dampproof coating membrane is formed on an outer surface of the translucent elastic membrane.

5. The optical lens as claimed in claim 1, wherein a third dampproof coating membrane is inserted into a middle of the translucent elastic membrane.

6. The optical lens as claimed in claim 1, wherein the dampproof coating membrane includes a translucent oxide layer of at least one layer.

7. The optical lens as claimed in claim 1, wherein the dampproof coating membrane includes a translucent oxide layer of at least one layer and a soft buffer layer of at least one layer.

8. The optical lens as claimed in claim 1, wherein the dampproof coating membrane is made of any one selected from the group consisting of parylene, polyurethane, Teflon, and fluoride coating polymer.

9. The optical lens as claimed in claim 6, wherein the translucent oxide layer is made of any one selected from the group consisting of $Al_2O_3$, $TiO_2$ and $SiO_2$.

10. The optical lens as claimed in claim 7, wherein the soft buffer layer is made of a transparent polydimethylsiloxane or polyurea layer.

11. The optical lens as claimed in claim 7, wherein the soft buffer layer is made of elastomer or transparent polymer.

12. The optical lens as claimed in claim 1, wherein the dampproof coating membrane comprises a dampproof layer of at least one layer which is made of any one selected from the group consisting of parylene, polyurethane, Teflon, and fluoride coating polymer, and a soft buffer layer of at least one layer which is made of any one selected from the group consisting of polydimethylsiloxane, polyurea, transparent elastomer and transparent soft polymer.

13. The optical lens as claimed in claim 1, wherein the translucent elastic membrane has a thickness of 10-500 um.

14. The optical lens as claimed in claim 1, wherein the dampproof coating membrane has a thickness of 1-50 um.

15. An optical lens comprising:
a translucent substrate where a lens chamber and a fluidic chamber which fluidly communicate with each other are formed;
a translucent elastic membrane which is formed to seal the lens chamber and the fluidic chamber;
a dampproof coating membrane which is formed on the translucent elastic membrane to prevent a fluid from permeating through and being absorbed into the translucent elastic membrane;
an actuator which is formed in contact with the fluidic chamber; and
the fluid with which the lens chamber and the fluidic chamber are filled, wherein the optical lens changes a pressure exerted to the translucent elastic membrane by changing a volume of the fluidic chamber using the actuator,
wherein the dampproof coating membrane is disposed between the translucent elastic membrane and the fluid, and a light passes through both the dampproof coating membrane and the translucent elastic membrane.

16. The optical lens as claimed in claim 15, wherein the translucent elastic membrane is made of polydimethylsiloxane.

17. The optical lens as claimed in claim 15, wherein the dampproof coating membrane is formed on an inner surface of the translucent elastic membrane.

18. The optical lens as claimed in claim 17, wherein a second dampproof coating membrane is formed on an outer surface of the translucent elastic membrane.

19. The optical lens as claimed in claim 15, wherein a third dampproof coating membrane is inserted into a middle of the translucent elastic membrane.

20. The optical lens as claimed in claim 15, wherein the dampproof coating membrane includes a translucent oxide layer of at least one layer.

21. The optical lens as claimed in claim 15, wherein the dampproof coating membrane includes a translucent oxide layer of at least one layer and a soft buffer layer of at least one layer.

22. The optical lens as claimed in claim 15, wherein the dampproof coating membrane is made of any one selected from the group consisting of parylene, polyurethane, Teflon, and fluoride coating polymer.

23. The optical lens as claimed in claim 20, wherein the translucent oxide layer is made of any one selected from the group consisting of $Al_2O_3$, $TiO_2$ and $SiO_2$.

24. The optical lens as claimed in claim 21, wherein the soft buffer layer is made of polydimethylsiloxane or polyurea layer.

25. The optical lens as claimed in claim 21, wherein the soft buffer layer is made of elastomer or transparent polymer.

26. The optical lens as claimed in claim 15, wherein the dampproof coating membrane comprises a dampproof layer of at least one layer which is made of any one selected from the group consisting of parylene, polyurethane, Teflon, and fluoride coating polymer, and a soft buffer layer of at least one layer which is made of any one selected from the group consisting of polydimethylsiloxane, polyurea, transparent elastomer and transparent soft polymer.

27. The optical lens as claimed in claim 15, wherein the translucent elastic membrane has a thickness of 10-500 um.

28. The optical lens as claimed in claim 15, wherein the dampproof coating membrane has a thickness of 1-50 um.

29. A method for manufacturing an optical lens, the method comprising:
    forming a lens chamber on a translucent substrate;
    forming a translucent elastic membrane to seal an opening of the lens chamber; and
    forming a dampproof coating membrane on the translucent elastic membrane to prevent a fluid from permeating through and being absorbed into the translucent elastic membrane, the lens chamber being filled with the fluid,
    wherein the dampproof coating membrane is disposed between the translucent elastic membrane and the fluid, and a light passes through both the dampproof coating membrane and the translucent elastic membrane.

30. The method as claimed in claim 29, further comprising $O_2$ plasma ashing prior to sealing the opening of the lens chamber with the translucent elastic membrane.

31. An optical lens comprising:
    a lens frame which has a lens chamber filled with an optical fluid;
    a translucent elastic membrane which is connected to an upper surface of the lens frame; and
    a dampproof coating membrane which is formed on the translucent elastic membrane to prevent the optical fluid from permeating through and being absorbed into the translucent elastic membrane,
    wherein the dampproof coating membrane is disposed between the translucent elastic membrane and the fluid, and a light passes through both the dampproof coating membrane and the translucent elastic membrane.

32. The optical lens as claimed in claim 31, wherein the dampproof coating membrane is formed on at least one or both of a surface of the translucent elastic membrane contacting the optical fluid and a surface of the translucent elastic membrane contacting air.

33. The optical lens as claimed in claim 31, wherein the translucent elastic membrane comprises a first translucent elastic membrane and a second translucent elastic membrane which are layered one on the other, and the dampproof coating membrane is formed between the first and the second translucent elastic membranes.

34. A method for manufacturing an optical lens, the method comprising:
    forming a lens frame which has a lens chamber filled with an optical fluid;
    forming a dampproof coating membrane on one side surface or opposite side surfaces of the translucent elastic membrane to prevent the optical fluid from permeating through and being absorbed into the translucent elastic membrane; and
    connecting the translucent elastic membrane where the dampproof coating membrane is formed to the lens frame,
    wherein the dampproof coating membrane is disposed between the translucent elastic membrane and the fluid, and a light passes through both the dampproof coating membrane and the translucent elastic membrane.

35. The method as claimed in claim 34, further comprising forming an additional dampproof coating membrane on an inner surface of the lens chamber of the lens frame after connecting the translucent elastic membrane to the lens frame.

\* \* \* \* \*